(12) United States Patent
Weiss

(10) Patent No.: US 8,695,452 B2
(45) Date of Patent: *Apr. 15, 2014

(54) BICYCLE SHIFTER

(71) Applicant: SRAM Deutschland GmbH, Schweinfurt (DE)

(72) Inventor: Martin Weiss, Schweinfurt (DE)

(73) Assignee: SRAM Deutschland GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,010

(22) Filed: Mar. 1, 2013

(65) Prior Publication Data

US 2013/0174688 A1   Jul. 11, 2013

Related U.S. Application Data

(63) Continuation of application No. 12/563,951, filed on Sep. 21, 2009, now Pat. No. 8,443,697.

(30) Foreign Application Priority Data

Sep. 20, 2008   (DE) .......................... 10 2008 048 134

(51) Int. Cl.
*F16C 1/10* (2006.01)
*G05G 1/10* (2006.01)
*B62K 23/06* (2006.01)
*B62M 25/04* (2006.01)
*F16C 1/12* (2006.01)

(52) U.S. Cl.
CPC ................ *B62K 23/06* (2013.01); *B62M 25/04* (2013.01); *F16C 1/12* (2013.01)
USPC ................ 74/502.2; 74/488; 74/489; 74/575; 74/577 R; 74/577 M

(58) Field of Classification Search
CPC ........................................................ F16C 1/12
USPC .................... 74/502.2, 475, 489, 575–577 M
IPC ........................................................ B62M 25/04
See application file for complete search history.

(56) References Cited

U.S. PATENT DOCUMENTS

| 5,203,213 | A  | * | 4/1993 | Nagano ...................... 74/473.14 |
| 7,000,496 | B2 | * | 2/2006 | Wessel et al. ................ 74/502.2 |
| 7,878,089 | B2 | * | 2/2011 | McLaughlin et al. ....... 74/502.2 |
| RE43,074  | E  | * | 1/2012 | Shahana ...................... 74/502.2 |
| 8,096,208 | B2 | * | 1/2012 | Sean .......................... 74/502.2 |
| 8,443,697 | B2 | * | 5/2013 | Weiss ........................... 74/502.2 |

(Continued)

*Primary Examiner* — Vinh Luong
(74) *Attorney, Agent, or Firm* — Milan Milosevic; Lisa Serdynski; Steven Courtright

(57) ABSTRACT

A shifter designed to actuate a gear change device of a bicycle by pulling and releasing a control cable. The shifter includes a base plate mountable to the bicycle, a cable spool and cable-pull and cable-release lever assemblies. The cable spool is rotated in a cable-pull direction to wind the control cable thereon and in a cable-release direction to unwind the control cable therefrom. The cable-pull and cable-release lever assemblies are operatively connected to the cable spool to rotate the cable spool in the cable-pull and cable-release directions, respectively. The cable-pull lever assembly includes a cable-pull lever rotated about a first axis and at least two winding pawls received by and rotating with the cable-pull lever about the first axis to transmit rotational movement of the cable-pull lever to the cable spool.

8 Claims, 2 Drawing Sheets

(56) References Cited

U.S. PATENT DOCUMENTS

2006/0053940 A1*  3/2006  McLaughlin et al. ....... 74/502.2
2013/0220056 A1*  8/2013  Kawakami et al. .......... 74/501.6
2013/0220057 A1*  8/2013  Kawakami et al. .......... 74/501.6

* cited by examiner

BICYCLE SHIFTER

This is a continuation of U.S. patent application Ser. No. 12/563,951 filed on Sep. 21, 2009.

BACKGROUND OF THE INVENTION

The present invention relates to the bicycle shifters and more particularly to a bicycle shifter having at least two winding pawls rotatable with a cable-pull lever to transmit the rotation of the lever to a cable spool to rotate the spool in a cable-pull direction.

German patent application DE 10 2004 051 883 A1 discloses a trigger shifter that includes cable-pull and cable-release levers that rotate a cable spool to wind and unwind a control cable thereon to shift between gears of a bicycle gear change device. The shifter also includes a winding pawl that, at rest, contacts transport teeth with no load to immediately transfer the movement of the cable-pull lever to the cable spool. The winding pawl is rotational fixed to the cable-pull lever such that when the cable-pull lever is rotated, the winding pawl engages the transport teeth to drive the cable spool to wind the control cable thereon. To unwind the control cable, the cable-release lever is rotated, causing a spring to disengage the winding pawl from the transport teeth to allow the cable spool to unwind the cable. One disadvantage of this shifter is that high tolerances are placed on the spring for the shifter to function properly, resulting in higher production costs. Also, due to the use of a single winding pawl, induced loading occurs in the shifter, resulting in wear and breakdowns.

SUMMARY OF THE INVENTION

The present invention provides a shifter for actuating a gear change device by pulling and releasing a control cable that minimizes the occurrence of induced loading in the shifter by having at least two winding pawls. The shifter generally includes a base plate mountable to the bicycle, a cable spool and cable-pull and cable-release lever assemblies. The cable spool rotates in a cable-pull direction to wind the control cable thereon and rotates in a cable-release direction to unwind the control cable therefrom. The cable-pull and cable-release assemblies are operatively connected to the cable spool to rotate the cable spool in the cable-pull and cable-release directions, respectively. The cable-pull assembly includes a cable-pull lever rotatable about a first axis and at least two winding pawls received by and rotating with the cable-pull lever about the first axis to transmit rotational movement of the cable-pull lever to the cable spool. In one embodiment of the present invention, the at least two winding pawls are diametrically opposed relative to the first axis to minimize induced loading on the base plate. The shifter may include a control plate rotationally fixed to the cable spool. The control plate includes at least two sets of transport teeth diametrically opposed relative to the first axis. The at least two winding pawls engage the at least two sets of transport teeth to rotate the cable spool in the cable-pull direction.

In one embodiment of the present invention, the cable-release lever assembly includes a cable-release lever and a shift plate for disengaging a winding pawl from the transport teeth to permit the cable spool to rotate in the cable-release direction when the cable-release lever is actuated. The shift plate includes ramps pivotally disengaging the winding pawl from the transport teeth. The winding pawl is spring-loaded and extends through crescent-shaped openings in the shift plate and the base plate which allow pivoting movement of the winding pawl. A coupling element connects the shift plate to the cable-release lever such that upon cable-release lever actuation, the cable-release lever pulls the coupling element to rotate the shift plate about the first axis. The shift plate and the coupling element embody a single piece of sheet metal. A return spring connected to the coupling element biases the cable-release lever and the shift plate to their initial rest positions.

These and other features and advantages of the present invention will be more fully understood from the following description of one embodiment of the invention, taken together with the accompanying drawings.

DETAILED DESCRIPTION

Figure 1:
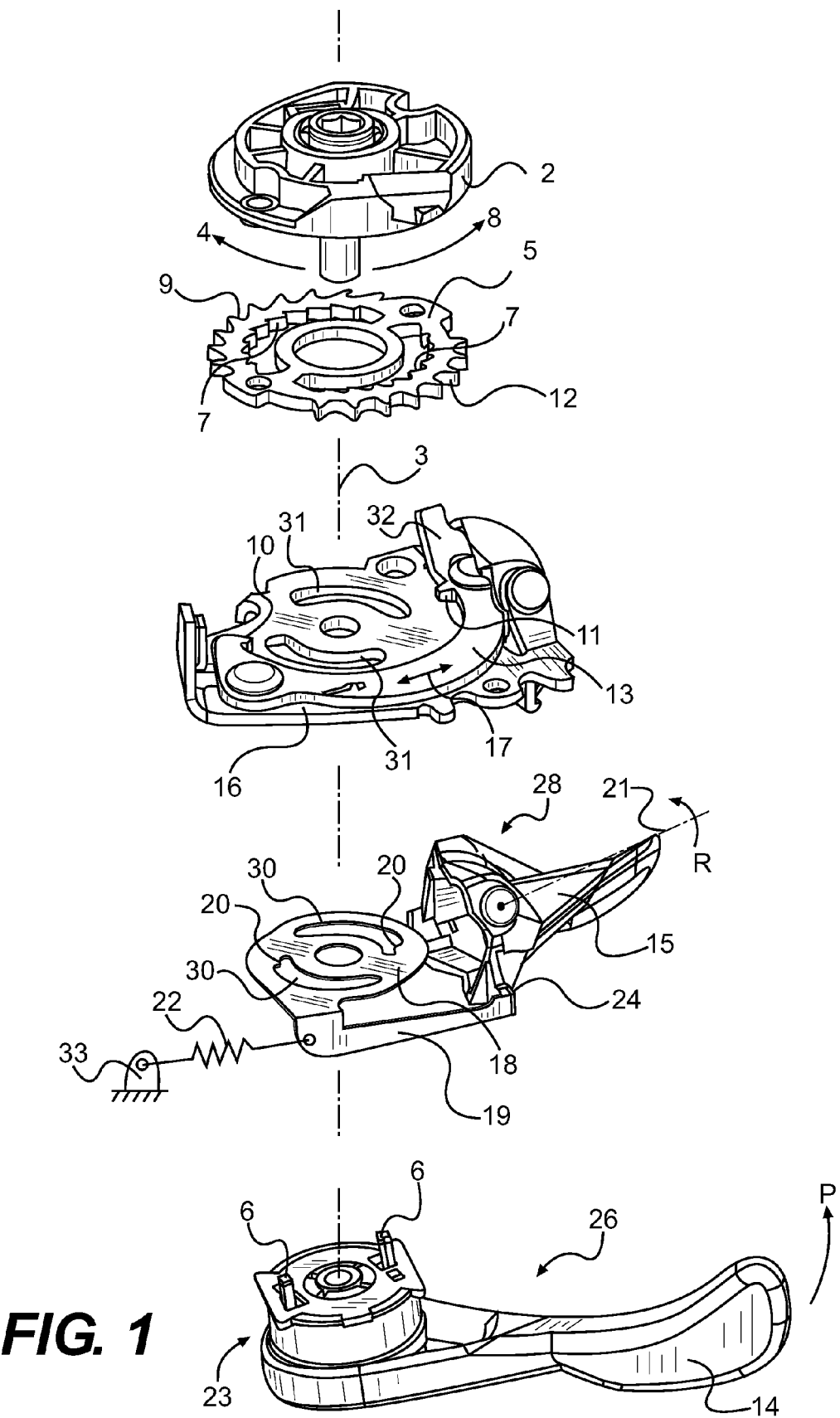
FIG. 1 is an exploded isometric view of a bicycle shifter according to one embodiment of the present invention.
Figure 2:
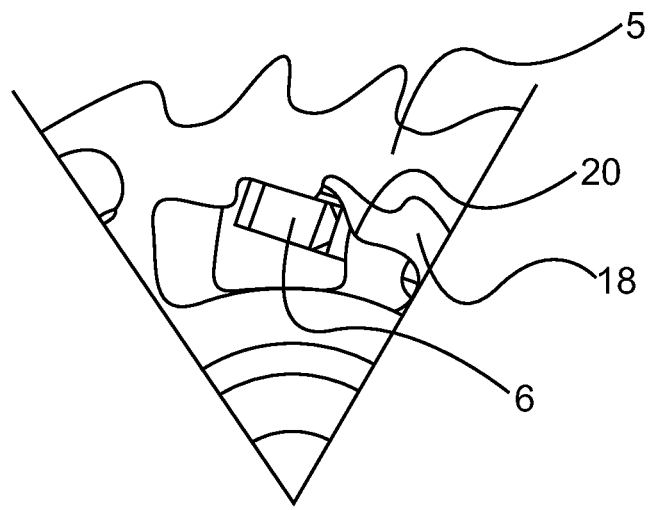
FIG. 2 is a partial sectional top view of the shifter of FIG. 1 showing a winding pawl in an initial rest position.
Figure 3:
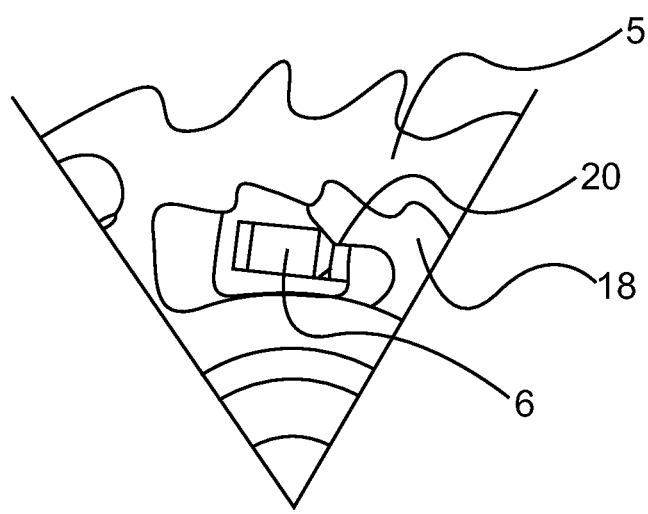
FIG. 3 is a partial sectional top view of the shifter of FIG. 1 showing the winding pawl displaced from its initial rest position.

FIGS. 1-3 illustrate a bicycle shifter according to one embodiment of the present invention. The bicycle shifter generally includes a base plate 16 attached to a housing (schematically represented by element 33) fixedly mountable to a handlebar, a cable spool 2, a control plate 5, a cable-pull lever assembly 26 and a cable-release lever assembly 28. The cable spool 2 is rotatable about a first axis 3 and receives an end of a control cable. The other end of the control cable is connected to a gear change device (not shown). To shift between gears, the control cable is pulled or released by actuating one of the pull and release lever assemblies 26, 28. The gear change device may be a derailleur, an internal gear hub or a similar device. The cable-pull lever assembly 26 is operatively connected to the cable spool 2 to rotate the cable spool 2 in a cable-pull direction 8 to wind the control cable thereon, thereby pulling the cable. The cable-release assembly 28 is operatively connected to the cable spool 2 to rotate the cable spool 2 in a cable-release direction 4 to unwind the control cable therefrom, thereby releasing the cable. The cable spool 2 is biased in the cable-release direction 4 by a return spring at the gear change device tensioning the control cable.

The control plate 5 is rotationally fixed to the cable spool 2 and has retention teeth 9, locking teeth 12 and two sets of transport teeth 7. The retention and locking teeth 9, 12 are arranged along the periphery of the control plate 5 opposite one another and the two sets of transport teeth 7 are arranged radially inwardly of the periphery of the control plate 5 and are diametrically opposed relative to the first axis 3. The cable-pull lever assembly 26 includes a cable-pull lever 14 having a hub 23 receiving two pivotally-mounted winding pawls 6. The winding pawls 6 extend through crescent-shaped openings 30, 31 in a shift plate 18 and the base plate 16, respectively. The crescent-shaped openings 30, 31 allow pivoting movement of the winding pawls 6. In an initial rest position, the winding pawls 6 are spring-biased to be disposed in front of the transport teeth 7, slightly offset from the transport teeth 7 or lightly contacting the transport teeth 7 to permit easier disengagement therefrom (see FIG. 2).

The cable-release lever assembly 28 generally includes a cable-release lever 15, a shift plate 18 and a sliding element 13. The cable-release lever 15 is rotatably supported on the base plate 16 through a shaft or a second axis 21 skewed from the first axis 3 to provide ergonomic cable-release actuation. The crescent-shaped openings 30 of the shift plate 18 include ramps 20 formed to pivotally disengage the winding pawls 6 from the transport teeth 7. In an initial rest position, the ramps 20 are disposed adjacent the winding pawls 6 (see FIG. 2). Upon rotation of the shift plate 18, the ramps 20 pivot the winding pawls 6 away from the transport teeth 7, against the spring force biasing the pawls toward their initial rest position (see FIG. 3). The cable-release lever 15 is connected to the shift plate 18 by a coupling element 19 at a contact point 24. The coupling element 19 is arranged tangentially to the rotatable shift plate 18. In this embodiment, the shift plate 18 and the coupling element are formed from a single thin sheet of steel, the coupling element 19 bent out of the plane of the shift plate 18. A distal end of the coupling element 19 also bent to form a pull tab at contact point 24 engageable by the cable-release lever 15. Upon rotation about the second axis 21, the cable-release lever 15 is configured to engage a push tab 32 of the sliding element 13. Upon rotation about the second axis 21, the release lever 15, the coupling element 19 and the shift plate 18 are configured to disengage the winding pawls 6 prior to engagement of the push tab 32 by the release lever 15. A return spring 22, disposed between the housing 33 and the coupling element 19, returns the coupling element 19 to its initial rest position.

The sliding element 13 includes a retention pawl 10 at one end and a locking pawl 11 at another end. The retention and locking pawls 10, 11 are alternatingly engageable with the retention and locking teeth 9, 12, respectively. When the levers 14, 15 are in initial rest positions, the retention pawl 10 is biased to engage the retention teeth 9 to hold the cable spool 2 in a current position, corresponding to a desired gear. The sliding element 13 is slidably mounted to the base plate 16 and arranged about the perimeter of the control plate 5 to position the retention pawl and the locking pawl proximate the retention and locking teeth, respectively. When the cable-release lever 15 is actuated, the sliding element 13 slides back and forth along path 17 to alternately engage the retention pawl 10 and the locking pawl 11 with the corresponding retention and locking teeth 9, 12 to provide a step-by-step release of the control cable and prevent uncontrolled unwinding of the cable spool. A return spring may return the cable-release lever 15 back to its initial rest position upon release.

To pull cable, the cable-pull lever 14 is rotated about the first axis 3 in a direction P, along with the winding pawls 6, the winding pawls 6 engaging the transport teeth 7 to drive the control plate 5 and the cable spool 2 in the cable-pull direction 8. As the control plate 5 and cable spool 2 rotate in the cable-pull direction 8, the retention pawl 10 of the sliding element 13 slides over the retention teeth 9 into a next retention tooth corresponding to a next gear. If desired, more than one gear may be shifted in the cable-pull direction 8 by a further rotation of the cable-pull lever 14, until the desired gear is reached. When the cable-pull lever 14 is released at the end of a cable-pull stroke, the cable-pull lever 14 and the winding pawls 6 return to their initial rest positions and the retention pawl 10 re-engages the retention teeth 9 to hold the cable spool 2 in the desired gear position.

To release cable, the cable-release lever 15 is initially rotated about the second axis 21 in a direction R, to pull the coupling element 19 which in turn rotates the shift plate 18 about the first axis 3. Rotation of the shift plate 18 urges the ramps 20 against the winding pawls 6 to pivot the pawls 6 out of engagement with the transport teeth 7. Upon continued rotation of the cable-release lever about the second axis 21 in the direction R, the lever 15 displaces the push tab 32 to slide the sliding element 13 and, in turn, disengage the retention pawl 10 from the retention teeth 9. Once the winding and retention pawls 6, 10 are disengaged from the transport and retention teeth 7, 9, respectively, the cable spool 2 rotates under the tension of the control cable until the locking pawl 11 of the sliding element 13 engages the next locking teeth 12. When the cable-release lever 15 is released at the end of a cable-release stroke, the cable-release lever 15 and the sliding element 13 return to their initial rest positions causing the locking pawl 11 to disengage from the locking teeth 12 and the retention pawl 10 to engage a next retaining tooth corresponding to a next gear. The shift plate 18 also returns to its initial rest position upon release of the cable-release lever 15, causing the winding pawls 6 to return their initial rest positions. During a cable-release stroke, the cable spool 2 is unwound in single gear increments.

While this invention has been described in reference to an embodiment, it should be understood that numerous changes could be made within the spirit and scope the inventive concepts described. Accordingly, it is intended that the invention not be limited to the disclosed embodiment, but that is have the full scope permitted by the language of the following claims.

What is claimed:

1. A shifter for operating a gear changing device of a bicycle, comprising:
    a shifter housing having a cable spool rotatably supported on a first axis;
    a control plate rotationally fixed to the cable spool, the control plate having transport teeth;
    a cable-pull lever assembly operatively connected to the cable spool to rotate the cable spool in the cable-pull direction, the cable-pull lever assembly including a cable-pull lever and a winding pawl rotatably disposed on and rotating with the cable-pull lever about the first axis, the winding pawl engaging the transport teeth to transmit cable-pull lever rotation to the cable spool;
    a cable-release lever assembly operatively connected to the cable spool to rotate the cable spool in the cable-release direction, the cable-release lever assembly including a cable-release lever rotatably supported about a second axis of rotation, the second axis skewed relative to the first axis;
    a shift plate rotatably supported about the first axis and contactingly disengaging the winding pawl from the transport teeth when the cable-release lever is rotated; and
    a coupling element connecting the shift plate to the cable-release lever.

2. The shifter of claim 1, including at least two winding pawls.

3. The shifter of claim 2, the at least two winding pawls diametrically opposed relative to the first axis.

4. The shifter of claim 3, the control plate including at least two sets of transport teeth diametrically opposed relative to the first axis, the at least two winding pawls engaging the at least two sets of transport teeth to rotate the cable spool in the cable-pull direction.

5. The shifter of claim 1, the shift plate including a ramp pivotally disengaging the winding pawl from the transport teeth.

6. The shifter of claim 5, the shift plate including a crescent-shaped opening, the ramp formed in the crescent-shaped opening, the winding pawl extending through the crescent-shaped opening allowing pivotal movement of the winding pawl.

7. The shifter of claim 6, the cable-release lever pulling the coupling element to rotate the shift plate about the first axis upon cable-release lever actuation.

8. The shifter of claim 7, the shift plate and the coupling element embodying a single piece of sheet metal.

\* \* \* \* \*